June 16, 1931. L. B. NEIGHBOUR 1,810,219
LUG FOR WHEELS
Filed Jan. 21, 1929
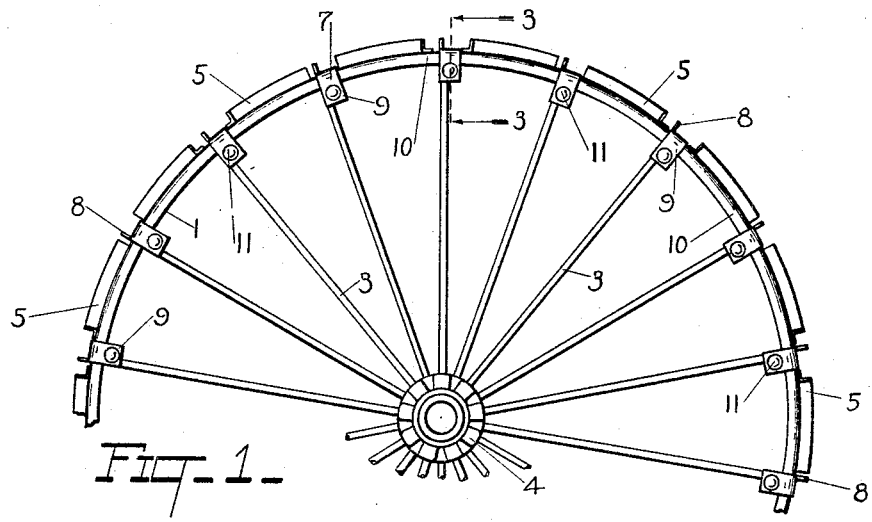
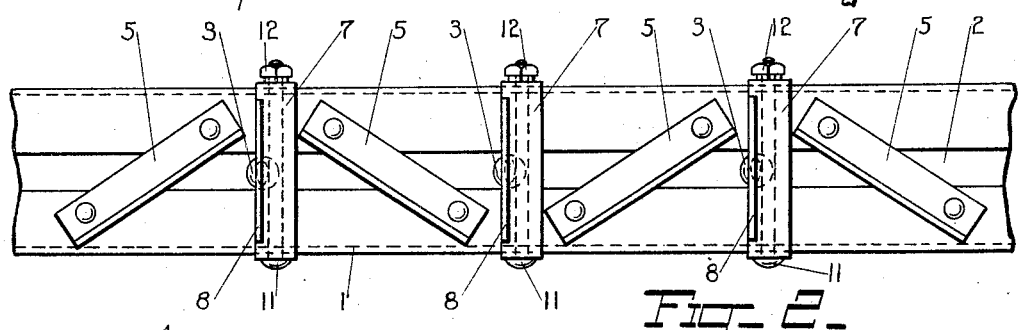
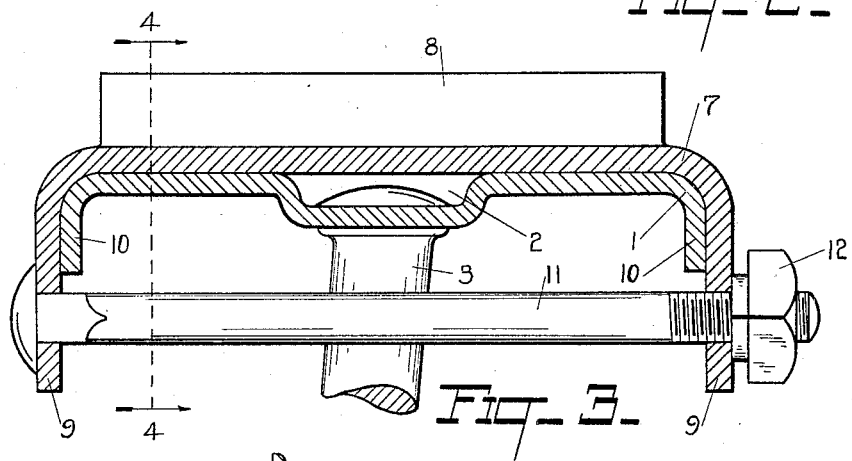
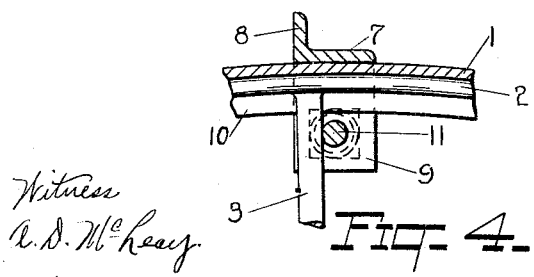
Inventor
Leonard B. Neighbour Patented June 16, 1931

1,810,219

UNITED STATES PATENT OFFICE

LEONARD B. NEIGHBOUR, OF MOLINE, ILLINOIS, ASSIGNOR TO DEERE & COMPANY, OF MOLINE, ILLINOIS, A CORPORATION OF ILLINOIS

LUG FOR WHEELS

Application filed January 21, 1929. Serial No. 334,079.

My invention relates to wheels and more particularly to that type employed with vehicles devoted to heavy work such as tractors and certain classes of agricultural machinery, in which it is necessary for the wheels to have a firm grip upon the ground and without the possibility of slipping. My invention has special reference to a particular form of lug readily attachable to and detachable from the tire of a wheel at a right angle to the plane of a wheel and supplementary to lugs with which a wheel may be provided.

Referring to the drawings in which similar numerals indicate identical parts—

Figure 1 is a side elevation of part of a tractor wheel embodying my invention.

Figure 2 is an enlarged fragmentary isometrical view of part of the wheel tire illustrating the application of my invention.

Figure 3 is an enlarged detail section on the line 3—3 of Figure 1, and,

Figure 4 is a fragmentary detail section on the line 4—4 of Figure 3.

The wheel rim or tire 1 is rolled in channel form with a central circumferential groove 2. Spokes 3 are secured to a hub 4 and their outer ends are riveted to the tire within the groove 2. Permanent lugs 5, preferably L-shaped in cross-section, are riveted on the tire 1 and are arranged alternately diagonally thereon. This construction is well known in the art but is not thoroughly effective in preventing wheels from slipping in soft ground. To the end that slipping will be avoided I have provided a lug which is intended for use as an accessory or supplemental lug to be utilized under conditions of the ground liable to result in slipping, and which can be readily attached to a wheel tire and as readily removed. This lug is mountable on a tire at a right angle to the plane of the wheel and between the permanent lugs, and as they are similar, and distinguishable from the permanent lugs in form and also the manner by which they are mounted and secured on a tire, it is believed a description of one will be sufficient.

The supplemental lug 7 is formed with a flat body portion to rest snugly on the tread surface of the tire 1, and extending outwardly therefrom and integral therewith is a blade 8 operative to penetrate the ground surface. The end portions 9 of the lug 7 are bent inwardly over the sides of the tire 1, and extend below the flanges 10 of the tire, each of said bent portions having a hole through which passes a headed bolt 11 on one end of which is a nut 12 operative on the bolt to clamp the inwardly bent portions against the sides of the tire and so secure the lug 7 rigidly in place. It will be noted that the lug 7 is secured on the tire solely by the clamping action, of the inwardly bent portions 9, created by operation of the nut 12, and that no other means of securing the lug 7 on the tire are employed. In the event of the lug 7 becoming loose upon the tire 1 while the wheel is rotating, or at any time, the bolt 11 will prevent movement of the lug 7, for I have so located the lug that it is in contact with the nearest permanent lug, and the bolt 11, when in place, is in contact with an adjacent spoke of the wheel, the permanent lug and spoke operating as braces to hold the lug 7 firmly from sliding on the tire.

Ordinarily, as previously stated, the permanent lugs 5 are sufficient, but in differing ground conditions the wheel will slip in rotating and when this occurs my supplemental lug is adapted to be readily mounted on the wheel tire to reinforce the action of the permanent lugs and prevent the wheel from slipping.

What I claim is:—

The combination with a wheel including a hub, spokes, and a tire having a plurality of lugs mounted permanently thereon and arranged alternately diagonally relatively to each other, of a supplemental lug mounted on the tire and in contact with one of the permanent lugs, and means operative to secure the supplemental lug to the tire, said means contacting with the adjacent spoke of the wheel.

LEONARD B. NEIGHBOUR.